Patented June 15, 1948

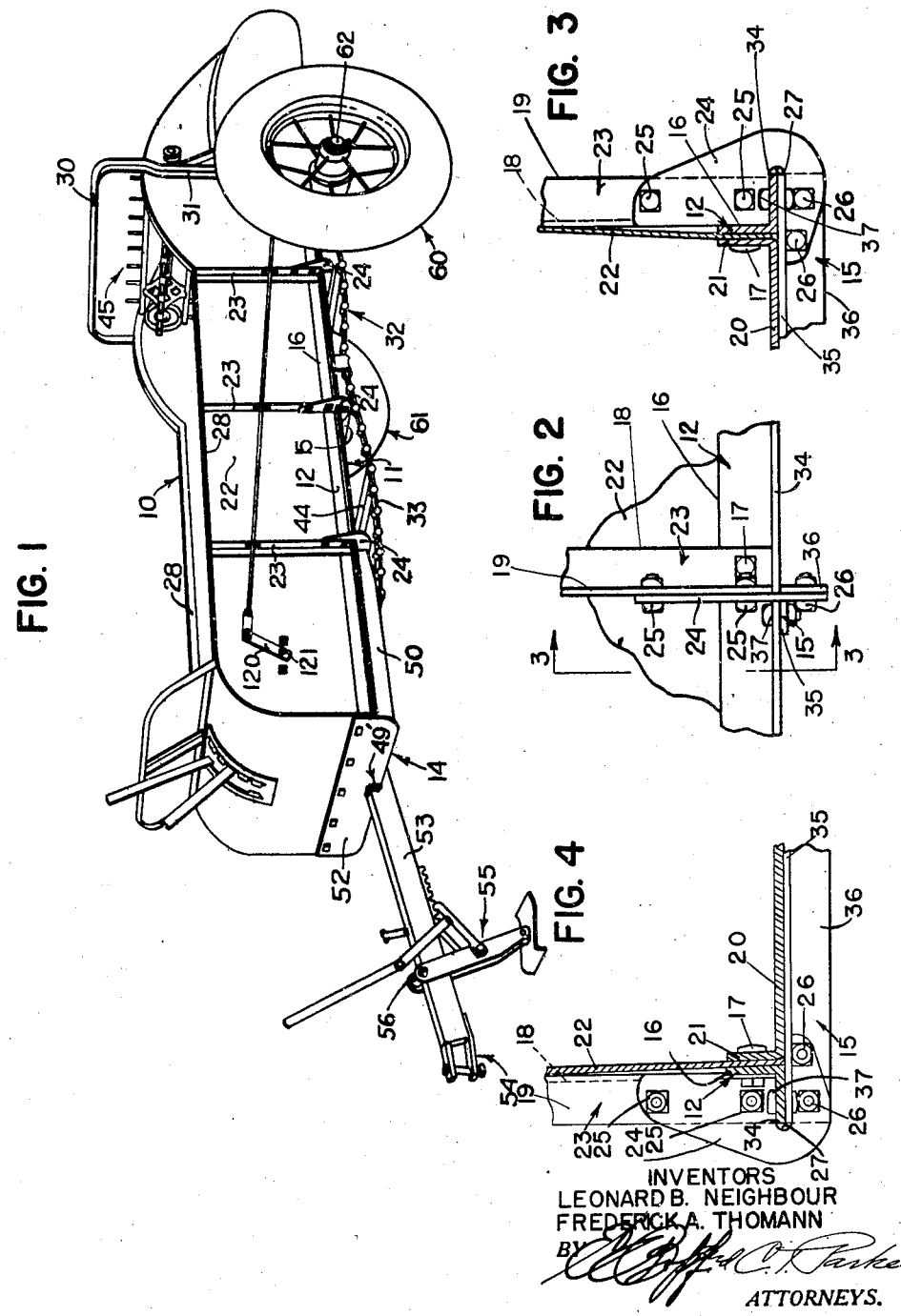

2,443,265

UNITED STATES PATENT OFFICE

2,443,265

VEHICLE BODY SIDE WALL BRACING CONSTRUCTION

Leonard B. Neighbour, Moline, and Frederick A. Thomann, East Moline, Ill., assignors to Deere & Company, Moline, Ill., a corporation of Illinois Application June 15, 1942, Serial No. 447,098, which is a division of application Serial No. 364,196, November 4, 1940. Divided and this application May 3, 1945, Serial No. 591,783

11 Claims. (Cl. 296—36)

The present invention relates generally to frame construction, and more particularly to vehicle body construction, and has for its principal object the provision of a novel and improved vehicle body, which is exceedingly stiff and rigid against lateral twisting or weaving, but which is light in weight and economical to manufacture.

A more specific object relates to the provision of a novel and improved bracing means for bracing the side walls of a vehicle body relative to the bottom, the bracing means being on the outside of the walls, but without greatly increasing the overall width of the body.

This application is a division of our co-pending application, Serial No. 447,098, filed June 15, 1942, and issued March 26, 1946, as Patent No. 2,397,429, which, in turn, is a division of our application, Serial No. 364,196, filed November 4, 1940, and issued November 24, 1942, as Patent 2,302,879.

These and other objects and advantages of our invention will be apparent to those skilled in the art after a consideration of the following detailed description of the preferred embodiment thereof, reference being had to the accompanying drawings, in which Figure 1 is a perspective view of a two wheeled manure spreader constructed according to the principles of our invention;

Figure 2 is a side elevational view showing an enlarged detail of one of the braces at the lower corner of the spreader box;

Figure 3 is a sectional elevational view taken along the line 3—3 in Figure 2; and Figure 4 is a similar view of a brace on the opposite side of the vehicle.

Referring now to the drawings, the manure spreader illustrated consists of a generally fore and aft extending body 10 supported on a frame structure 11 comprising a pair of laterally spaced longitudinally extending angle iron frame members 12, which are joined together at their forward ends by a hitch frame 14. The hitch frame 14 comprises a pair of longitudinally disposed laterally spaced members 50 (only one of which is shown) which are fixedly secured to the undersides of the longitudinal frame members 12 at the front ends thereof. The members 50 are connected together by a transverse beam 52 comprising a vertically disposed flat plate or bar. A box section draft tongue 53 is centrally disposed beneath the forward end of the body 10 and is rigidly secured, as by welding, to the lower edge of the member 52, indicated at 49'.

Transversely disposed structural angle members 15 connect the frame members 12 at longitudinally spaced intervals, and a sheet metal bed or flooring 20 rests upon and is fixed to the cross members 15 and has upwardly turned flanges 21 at the sides thereof which are fixed to the longitudinal frame members 12 by suitable means, such as by riveting or bolting. The side walls of the spreader body are indicated by reference numeral 22 and are preferably made of sheet metal which is fixed to vertical angle members 23. The upper edge and curved front end of each of the side walls is reinforced by a light angle member 28, one flange of which is fixed to the inner side of the side wall 22 and the other flange of which extends outwardly over the edge of the side wall. Each of the longitudinal frame members 12 is positioned with a vertical flange 16 lying against the outer side of the side wall 22 and secured thereto by means of a bolt 17, which extends through suitable aligned apertures in the flange 16, the flange 21, the side wall 22, and through a fore and aft extending flange 18 on the vertical frame member 23. The other flange 19 of the vertical angle member 23 extends outwardly from the side wall 22 in a transverse plane. Each of the longitudinal frame members 12 has a horizontally disposed flange 34, which extends laterally outwardly substantially perpendicular to the vertical flange 16, and the vertical frame member 23 terminates in abutment with the top surface of the horizontal flange 34.

The transverse frame member 15 is also a structural angle member which has a horizontal flange 35 on which the floor plate 20 is supported. The member 15 extends laterally outwardly under the longitudinal members 12 and has its horizontal flange 35 lying in juxtaposition with the bottom surface of the horizontal flange 34 of the members 12. The member 15 also has a vertical flange 36 which extends downwardly from the rear edge of the horizontal flange 35, and the member 15 is positioned beneath the body of the vehicle with the forward surface of the vertical flange 36 disposed in a transverse plane which is common to the plane of the forward surface of the flange 19 of the vertical frame member 23.

The three frame members 12, 15 and 23 are thus disposed perpendicular to each other and are rigidly interconnected, by means which will now be described, to form an exceedingly strong structure. A brace 24 comprising a flat plate lies against the forward surface of the transverse flange 19 of the vertical frame member 23 and is secured thereto by bolts 25. The plate 24 is provided with a horizontal slot 27, which is substantially equal in width to the combined thicknesses of the juxtaposed flanges 34, 35, and receives the latter to hold them tightly together. The bottom portion of the plate 24 beneath the slot 27 lies in juxtaposition with the forward side of the vertical flange 36 and is secured thereto by two bolts 26. The flanges 34, 35 are rigidly secured together by means of a vertical bolt 37, and the longitudinal flange 18 of the vertical frame member 23 is secured by the bolt 17 in juxtaposition with the outer surface of the vertical flange 16 of the longitudinal frame member 12.

This construction provides a brace joint of great strength for preventing the sides of the body from spreading, and at the same time eliminates the need for projecting the ends of the transverse members 15 a considerable distance laterally outwardly beyond the sides of the body to secure a connection for the brace.

The sides of the body are tied together at the top by an angle iron member 30 formed in the shape of an inverted U, the extremities 31 thereof projecting down along the exterior of the side walls 22 and being secured thereto. The arch portion of the member 30 extends far enough above the side walls of the body to permit a heaped-up load of material carried by the body to pass thereunder.

The material carried in the body is caused to travel gradually rearwardly therein, when the machine is in operation, by an endless belt conveyor apron 32 of the type comprising a pair of laterally spaced endless chains 33, which are trained over sprockets at the front and rear end of the body, respectively, the details of which are clearly shown and described in our above mentioned Patent No. 2,397,429.

The two chains 33 are inter-connected by a series of longitudinally spaced slats 44, which scrape along the surface of the floor plate 20 to move the material rearwardly toward the rotating beating and distributing mechanism, indicated generally by the reference numeral 45.

The rear end of the spreader body is supported on a pair of laterally spaced ground wheels 60, 61, which are journaled on a transverse axle 62. Further details of this construction can be found in our Patent 2,302,879.

The forward end of the body is carried on the draft tongue 53, the forward end of which is carried on a tractor drawbar (not shown) by means of a suitable hitch clevis 54. When the implement is disconnected from the tractor, the draft tongue 53 is supported on a jack 55, which is mounted on a transverse pivot 56 and can be swung upwardly against the tongue 53 during transport.

We claim:

1. In a structural frame, a pair of structural members generally perpendicular one to the other having juxtaposed flanges, a third structural member having an end abutting one of said flanges, and bracing means for rigidly securing said members together comprising a plate lying against said third member and fastened thereto, and having a slot positioned to receive the edge and end, respectively, of said juxtaposed flanges for holding the latter together.

2. In a structural frame, a pair of structural members generally perpendicular one to the other having juxtaposed flanges, a third structural member disposed generally perpendicular to each of said pair of members and having an end abutting one of said flanges and bracing means for rigidly securing said members together comprising a flat plate lying against said third member and fastened thereto, and having a slot positioned to receive the edge and end, respectively, of said juxtaposed flanges for holding the latter together.

3. In a vehicle body structure, a pair of laterally spaced longitudinally extending frame members having horizontal flange portions, a cross member extending between said frame members and having a horizontal flange disposed in juxtaposed relation to said frame member flanges, a pair of vertical frame members rising from said juxtaposed flanges at opposite ends of said cross member, respectively, and a brace at each end of said cross member, each brace comprising a transverse vertical plate rigidly secured to said vertical member and having a horizontal slot adapted to receive the edge and end, respectively, of said juxtaposed flanges.

4. In a vehicle body structure, a pair of frame members generally perpendicular one to the other having flanged portions disposed in juxtaposition and other flanges disposed perpendicular thereto and extending on opposite sides therefrom, respectively, a third frame member having a surface disposed in the plane of one of said other flanges but on the opposite side of said juxtaposed flanged portions therefrom, and a plate lying against the coplanar surfaces of said third member and said other flange and rigidly fixed thereto, and having a slot positioned to receive said juxtaposed flange portions.

5. In a vehicle body structure, a longitudinal frame member having a horizontal flange and a vertical flange, a transverse frame member having a horizontal flange disposed in juxtaposition with said longitudinal horizontal flange and also having a vertical flange extending oppositely to said longitudinal vertical flange, a vertical frame member abutting on one of said juxtaposed flanges and extending in one direction therefrom, and a bracing member comprising a plate lying against said vertical member and against the one of said vertical flanges disposed on the opposite side of said juxtaposed horizontal flanges from said vertical member and rigidly fixed thereto, and having a slot positioned to receive said juxtaposed flange portions.

6. In a vehicle body structure, a pair of frame members generally perpendicular one to the other having flanged portions disposed in juxtaposition and other flanges disposed perpendicular thereto and extending on opposite sides therefrom, respectively, a third frame member disposed generally perpendicular to each of the first mentioned frame members and terminating in substantial abutment with one of said juxtaposed flanges, said third frame member extending from the abutting flange in a direction opposite to a certain one of said other flanges, and a plate lying against said third member and said certain flange and rigidly fixed thereto, and having a slot positioned to receive said juxtaposed flange portions.

7. In a vehicle body structure, a longitudinally extending frame member having a horizontal flange, a cross member extending at an angle to said frame member, said cross member having a horizontal flange disposed in juxtaposed relation to said frame member flange, a vertical frame member rising from said juxtaposed flanges at the end of said cross member and a brace at said end of said cross member, said brace comprising a transverse vertical plate rigidly secured to said vertical member and having a horizontal slot adapted to receive the edge and end, respectively, of said juxtaposed flanges.

8. In a vehicle body structure, a pair of laterally spaced longitudinally extending frame members having horizontal flanges and upwardly extending vertical flanges, side walls attached to said vertical flanges, a transverse frame member having a horizontal flange disposed in juxtaposed relation with said horizontal flanges of said longitudinal frame members, a floor plate supported on said horizontal flange of said transverse member inwardly of said longitudinally extending members, a pair of vertical frame members rising from said juxtaposed flanges at the ends of said transverse member, respectively, and a brace at each end of said transverse member, each of said braces comprising a transverse vertical plate rigidly attached to the adjacent vertical member and having a horizontal slot adapted to receive the edge and end, respectively, of said juxtaposed flanges associated therewith.

9. In a vehicle body structure, a longitudinal frame member having a horizontal flange and an upwardly extending vertical flange, a side wall attached to said vertical flange, a transverse frame member having a horizontal flange disposed in juxtaposed relation with said horizontal flange of said longitudinal member, a vertical flange depending from said horizontal flange of said transverse member, a floor plate supported on the latter inwardly of said juxtaposed flanges, a vertical frame member extending upwardly from the top of said longitudinal horizontal flange, and a bracing plate lying flat against said vertical frame member and said depending flange and rigidly fixed thereto, and having a slot positioned to receive said juxtaposed horizontal flanges.

10. In a vehicle body structure, a pair of longitudinal frame members having horizontal flanges and upwardly extending vertical flanges, side walls attached to the inner sides of said vertical flanges, a cross member having a depending vertical flange and a horizontal flange disposed in juxtaposed relation with said horizontal flanges of said longitudinal members, vertical frame members rising from said juxtaposed flanges at the ends of said cross member, respectively, and a brace at each end of said cross member, each brace comprising a transverse vertical plate rigidly secured to the adjacent vertical member and to the depending vertical flange of the cross member and having a horizontal slot adapted to receive said juxtaposed flanges, associated therewith.

11. In a vehicle body structure, a pair of laterally spaced longitudinally extending frame members having horizontal flange portions and vertical flange portions, side walls attached to said vertical flange portions, respectively, a cross member extending between said frame members and having a horizontal flange disposed in juxtaposed relation to said frame member horizontal flanges, a pair of vertical frame members rising from said juxtaposed flanges at opposite ends of said cross member, respectively, and a brace at each end of said cross member, each brace comprising a transverse vertical plate rigidly secured to the adjacent vertical member and having a horizontal slot adapted to receive the edge and end, respectively, of said juxtaposed flanges associated therewith.

LEONARD B. NEIGHBOUR.
FREDERICK A. THOMANN.

REFERENCES CITED

The following references are of record in the file of this patent:

UNITED STATES PATENTS

| Number | Name | Date |
|---|---|---|
| 814,436 | Einfeldt | Mar. 6, 1906 |
| 1,730,777 | Mayer | Oct. 8, 1929 |
| 1,808,082 | Thompson | June 2, 1931 |

FOREIGN PATENTS

| Number | Country | Date |
|---|---|---|
| 226,921 | Great Britain | Jan. 8, 1925 |
| 433,078 | Great Britain | Aug. 8, 1935 |